(12) United States Patent
Qiu et al.

(10) Patent No.: US 11,899,645 B1
(45) Date of Patent: Feb. 13, 2024

(54) TWO PHASE MOVE OF DATABASE TABLES

(71) Applicant: SAP SE, Walldorf (DE)

(72) Inventors: Fei Qiu, Xi'an (CN); Hans-Joerg Leu, Dossenheim (DE); Srinivas Gajjalakonda, Heidelberg (DE); Dan Ding, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/942,035

(22) Filed: Sep. 9, 2022

(51) Int. Cl.
*G06F 16/22* (2019.01)
*G06F 16/21* (2019.01)
*G06F 16/23* (2019.01)
*G06F 16/27* (2019.01)

(52) U.S. Cl.
CPC ........ *G06F 16/2282* (2019.01); *G06F 16/211* (2019.01); *G06F 16/2379* (2019.01); *G06F 16/27* (2019.01)

(58) Field of Classification Search
None
See application file for complete search history.

(56) References Cited

U.S. PATENT DOCUMENTS

| 2004/0083347 | A1* | 4/2004 | Parson | G06F 16/9014 707/E17.036 |
| 2020/0320098 | A1* | 10/2020 | Sharma | G06F 16/2379 |
| 2021/0149915 | A1* | 5/2021 | Lee | G06F 16/2282 |
| 2023/0066989 | A1* | 3/2023 | Iskender | G06F 16/213 |

* cited by examiner

*Primary Examiner* — Christopher J Raab
(74) *Attorney, Agent, or Firm* — Fountainhead Law Group P.C.

(57) ABSTRACT

A two phase move technique for moving groups of tables may reduce cross-host communication and length of table locks. A group including a first table and a second table may be moved to the destination host system. This is done by creating a third table replicating the first table and creating a fourth table replicating the second table on the destination host, and replicas of other tables in the group. The tables in the group are not locked against modifications during the creation of the replica tables. After the creation of the replicas, roles of the original tables and the created tables are switched such that the original tables are set to the replica role and the created tables stored on the destination are set to the source role. The original tables are dropped after the switching of the roles.

20 Claims, 5 Drawing Sheets

TWO PHASE MOVE OF DATABASE TABLES

BACKGROUND

The present disclosure pertains to database systems and in particular to moving tables between host systems of a database system.

In certain distributed database systems, tables and table partitions are assigned to a particular host system (e.g., to software service executing on the host system) at their time of creation and this this assignment may be changed. For example, if the database system initiates a plan to remove a particular host system from the system, then it may first move all the data (e.g., tables of the database) on that host system to the other hosts in the distributed database system. Redistributing tables may also be performed when the current distribution is no longer optimal.

Although it is possible to manually input commands to move tables and table partitions from one host system to another host system, this is neither practical nor feasible for a large-scale redistribution of data. Distributed database systems may support several redistribution operations that use complex algorithms as well as configurable table placement rules and redistribution parameters to evaluate the current distribution and determine a table distribution depending on the situation. Another complication is that redistributing tables and table partitions between the host systems may cause a delay in accessing those tables. For example, in certain prior database systems an application may be unable to access those tables for a period of time due to a table-lock or the application may experience delays in receiving query results due to communication between host systems (referred to as "cross-host" or "cross-node" communication).

The present disclosure addresses these issue and others, as further described below.

SUMMARY

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to store a first group of tables of a database on a first host system. The first group of tables may include a first table and a second table. The first table may be set to a source role. The second table may also be set to the source role. The instructions may also be executable by the one or more processors to create a third table on a second host system. The third table may replicate the first table and may be set to a replica role. The creation of the third table may include a first transfer of first information of the first table from the first host system to the second host system. The first table and the second table may not be locked against modifications during the first transfer of the first information or the creation of the third table. The instructions may also be executable by the one or more processors to create a fourth table on the second host system. The fourth table may replicate the second table and may set be to the replica role. The creation of the fourth table may include a second transfer of second information of the second table from the first host system to the second host system. The first table and the second table may not be locked against modifications during the second transfer of the second information or the creation of the fourth table. The instructions may also be executable by the one or more processors to, after the creation of the third table and the creation of fourth table, switch roles of the first table and the third table such that the first table stored on the first host system is set to the replica role and the third table stored on the second host system is set to the source role. The instructions may also be executable by the one or more processors to, after the creation of the third table and the creation of fourth table, switch roles of the second table and the fourth table such that the second table stored on the first host system is set to the replica role and the fourth table stored on the second host system is set to the source role. The instructions may also be executable by the one or more processors to drop the first table after the switching of the roles of the first table and the third table. The instructions may also be executable by the one or more processors to drop the second table after the switching of the roles of the second source table and the second replica table.

Some embodiments provide one or more non-transitory computer-readable medium storing computer program code comprising sets of instructions. The computer program code may include sets of instructions to store a first group of tables of a database on a first host system. The first group of tables may include a first table and a second table. The first table may be set to a source role. The second table may also be set to the source role. The computer program code may also include instructions to create a third table on a second host system. The third table may replicate the first table and may be set to a replica role. The creation of the third table may include a first transfer of first information of the first table from the first host system to the second host system. The first table and the second table may not be locked against modifications during the first transfer of the first information or the creation of the third table. The computer program code may also include instructions to create a fourth table on the second host system. The fourth table may replicate the second table and may set be to the replica role. The creation of the fourth table may include a second transfer of second information of the second table from the first host system to the second host system. The first table and the second table may not be locked against modifications during the second transfer of the second information or the creation of the fourth table. The computer program code may also include instructions to, after the creation of the third table and the creation of fourth table, switch roles of the first table and the third table such that the first table stored on the first host system is set to the replica role and the third table stored on the second host system is set to the source role. The computer program code may also include instructions to, after the creation of the third table and the creation of fourth table, switch roles of the second table and the fourth table such that the second table stored on the first host system is set to the replica role and the fourth table stored on the second host system is set to the source role. The computer program code may also include instructions to drop the first table after the switching of the roles of the first table and the third table. The computer program code may also include instructions to drop the second table after the switching of the roles of the second source table and the second replica table.

Some embodiments provide a computer-implemented method. The method may comprise storing a first group of tables of a database on a first host system. The first group of tables may include a first table and a second table. The first table may be set to a source role. The second table may also be set to the source role. The method may further include creating a third table on a second host system. The third table may replicate the first table and may be set to a replica role. The creation of the third table may include a first transfer of first information of the first table from the first host system to the second host system. The first table and the second table may not be locked against modifications during the first transfer of the first information or the creation of the third table. The method may further include creating a fourth table on the second host system. The fourth table may replicate the second table and may set be to the replica role. The creation of the fourth table may include a second transfer of second information of the second table from the first host system to the second host system. The first table and the second table may not be locked against modifications during the second transfer of the second information or the creation of the fourth table. The method may further include, after the creation of the third table and the creation of fourth table, switching roles of the first table and the third table such that the first table stored on the first host system is set to the replica role and the third table stored on the second host system is set to the source role. The method may further include, after the creation of the third table and the creation of fourth table, switching roles of the second table and the fourth table such that the second table stored on the first host system is set to the replica role and the fourth table stored on the second host system is set to the source role. The method may further include dropping the first table after the switching of the roles of the first table and the third table. The method may further include dropping the second table after the switching of the roles of the second source table and the second replica table.

The following detailed description and accompanying drawings provide a better understanding of the nature and advantages of the present disclosure.

DETAILED DESCRIPTION

Figure 1:
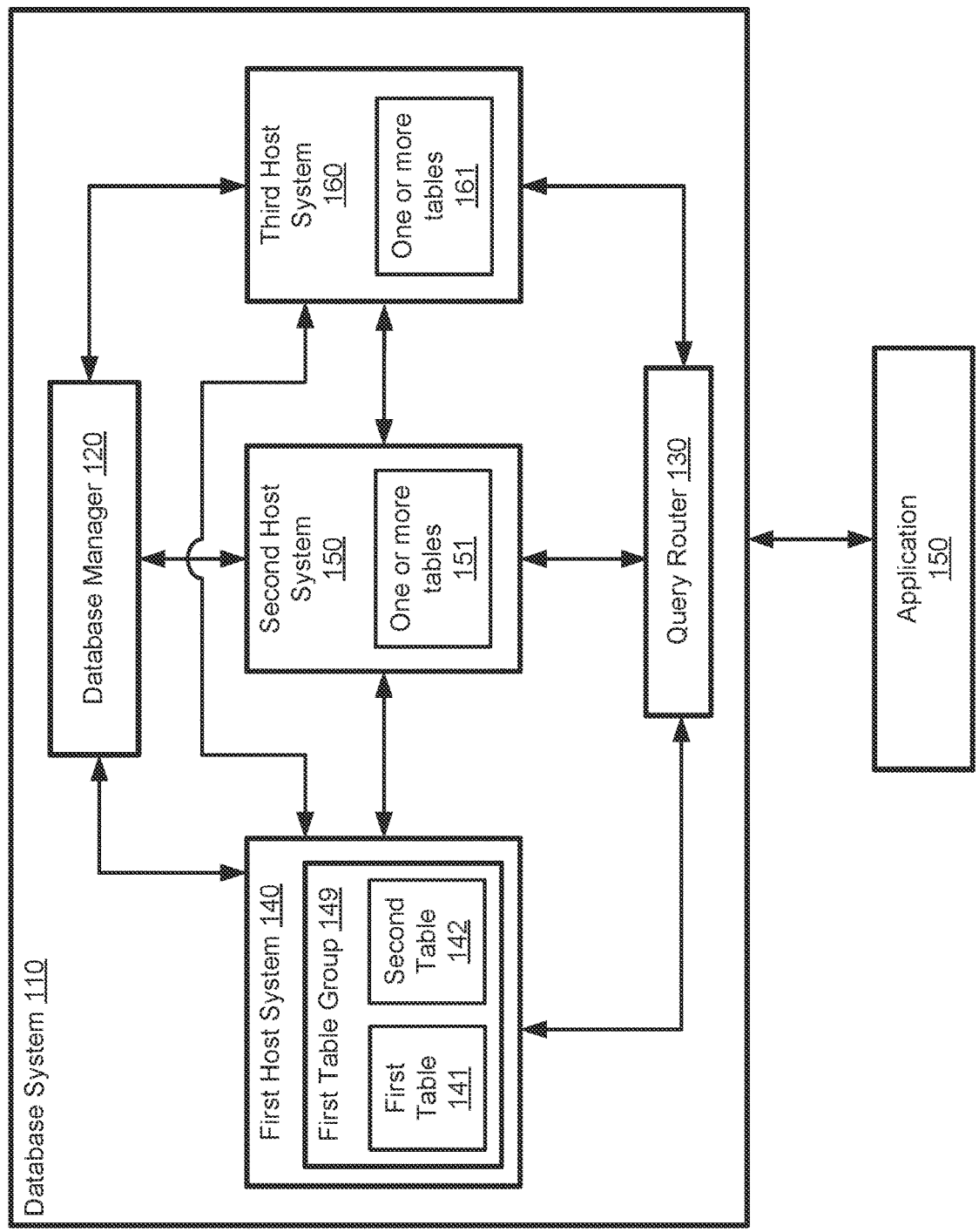
FIG. 1 shows a diagram of distributed database system including multiple host systems storing database tables, including a first host system storing a first table group, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

In some modern distributed database systems, tables and table partitions are assigned to a service operating a particular host system (e.g., computer system) at their time of creation. However, this this assignment can be changed. For example, if the distributed database system plans to remove a host system, then it may need to first move data on that host to other host systems in the distributed database system so that the data is not lost. Redistributing tables may also be useful if the current distribution is not optimal.

As mentioned above, it is neither practical nor feasible for a large-scale redistribution of data to be performed by manually moving tables and table partitions from one host system to another. Table distribution is complex and redistribution of tables may lead to delays in table access as mentioned above.

In certain distributed database systems, tables may be "grouped" such that the table distribution plan assigns them to the same host system. Queries that access tables in that group may be routed to the host system that the group is assigned to and the query may be processed without the host communicating with another host system.

FIG. 1 shows a diagram of distributed database system 110 including multiple host systems 140, 150, 160 storing database tables, including a first host system 140 storing a first table group 149, according to an embodiment. The database system 110 includes the multiple host systems including the first host system 140, a second host system 150, and a third host system 160. These host systems may communicate with each other using one or more network connections. The database system may also include additional host systems not shown in FIG. 1. The database system 110 includes a database manager component 120 and a query router component 130. An application (e.g., a cloud application).

The database manager component 120 may be configured to perform or initiate performance of table distribution, table redistribution planning, table copying, setting of host roles, setting of table roles, enabling of replica tables (non-source tables that replicate a particular source table), dropping of tables, locking of tables, and other database or host system management functions. A database manager component is further described below with respect to FIG. 2.

The query router component 130 is be configured to receive queries from the application 150 and route the query to a particular host system. The query router 130 may access a table or list indicating which tables are stored at which host systems in order to route the query. In the example shown in FIG. 1, a first table 141 and a second table 142 may be grouped together as a first table group 149. The query router 130 may route queries for tables in the first table group 149 to the first host system 140. However, in some situations the application 150 may make a query based on tables in the first table group 149 as well as one or more table 151 stored at the second host system 150 or one or more tables 161 stored at the third host system 160. In such cases, cross-host communication may be performed. For instance, The query router 130 may route the query to the first host system 140 and the first host system 140 may communicate with another host system (e.g., over a network connection) to access the other tables used in the query. Such cross-host communication introduces latency and delays that would not occur if the tables needed to respond to the query were available on the host system processing the query.

In certain distributed database systems, delays in processing queries may also occur when tables are moved. Moving tables groups while an application is using these tables may result in increased cross-host communication, result in a high probability of performance degradation for the application. As mentioned above, tables may be grouped together. Tables may be grouped when they will be used together in queries by an application. However, moving of grouped tables may lead to cross-node communication. For instance, if the first table 141 of the first table group 149 is being moved while the move of the second table 142 table in this first table group 149 is scheduled to be moved and delayed, access to the first table 141 table during the move operation might be blocked by a table lock (e.g., initiated by the table move operation). Or, if the first table 141 is already moved (e.g., to the second host system 150 or the third host system 160) but the second table 142 in the first table group 149 remains on the first host system 140, an operation like a join may lead to at least one intermediate result transfer (e.g., using cross-host communication) between the two host systems. In high load environments, additional query execution time may cause performance issues in the application.

The present disclosure provides an improved move operation in two phases for use in distributed database systems. The two-phase move operation for grouped tables improves upon prior distributed database systems as the move operation reduces delays caused by table-locks and cross-host communication during the move.

In the first phase, the move operation start to replicate all source tables of the table group on a first host system to the second (destination) host system. The source tables may be initially locked in a short period to propagate the replication (e.g., update a catalog of tables). After this short interruption, the content of the tables is replicated (e.g., copied and enabled) to its new location on the second host system. From the Application 150 perspective, the physical table layout is the same. The Application 150 can continue to use the original tables with to be expected low impact on query performance. Several table groups may be processed in parallel to speed up the Table Redistribution Plan Execution.

In the second phase, after replication of all tables in a group is complete, the source-replica role of the table will be switched and the former replica source will be dropped. At this point, the new physical location of the tables is propagated and queries will be routed to the new location.

Figure 2:
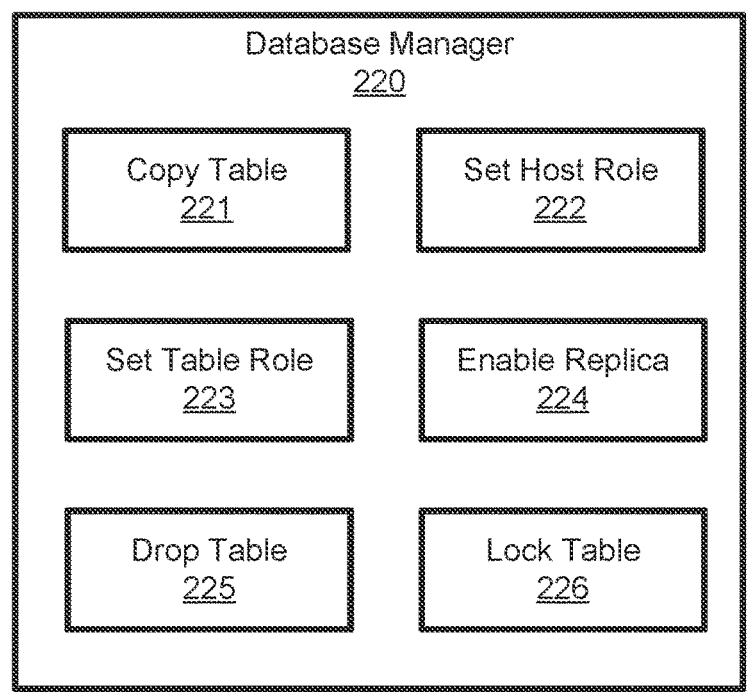
FIG. 2 shows a diagram of a database manager component of a database system and functional components of the database manager, according to an embodiment.
Figure 3:
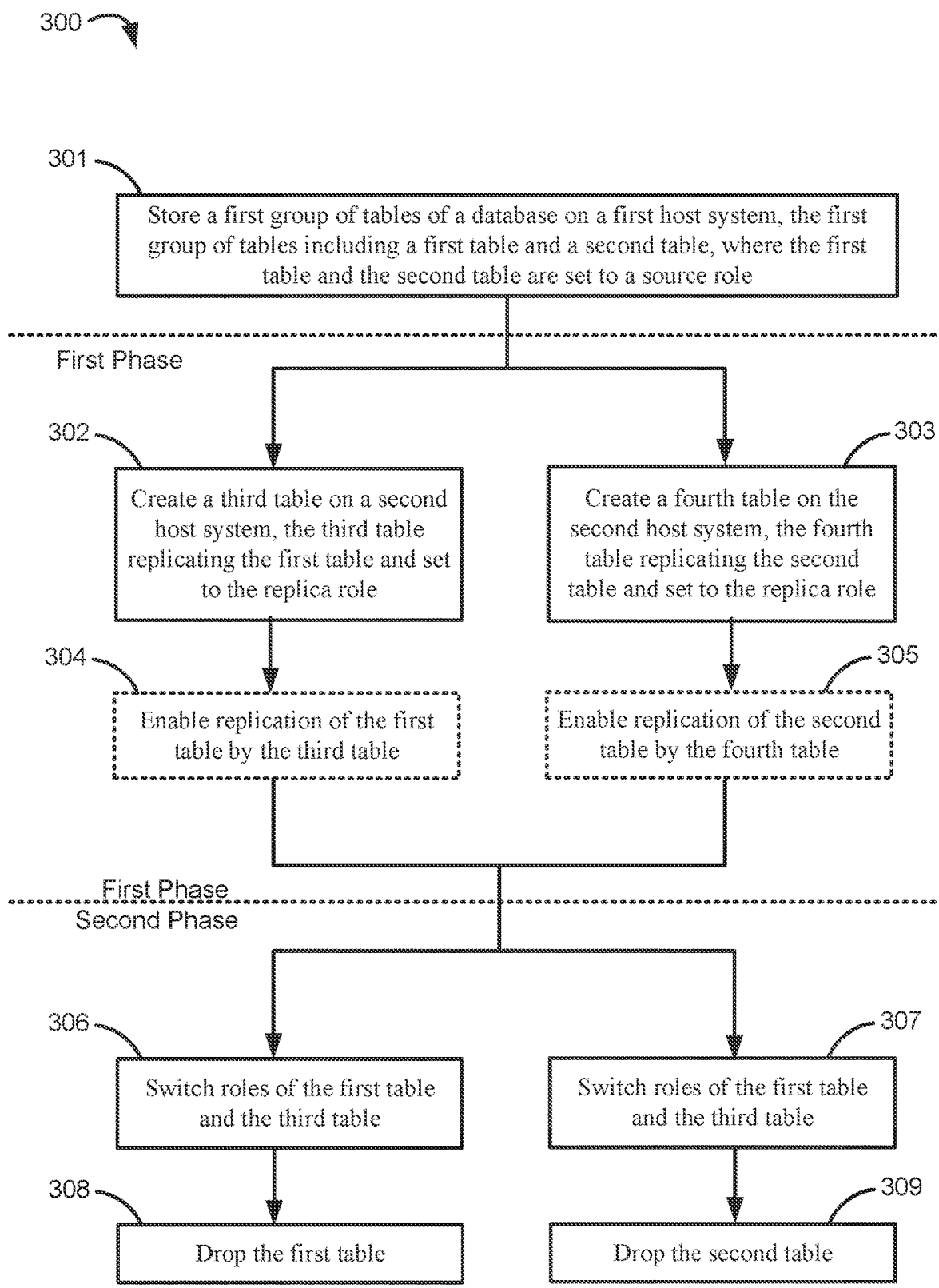
FIG. 3 shows a flow chart of a process for a two-phased move of grouped tables, according to an embodiment.
Figure 4:
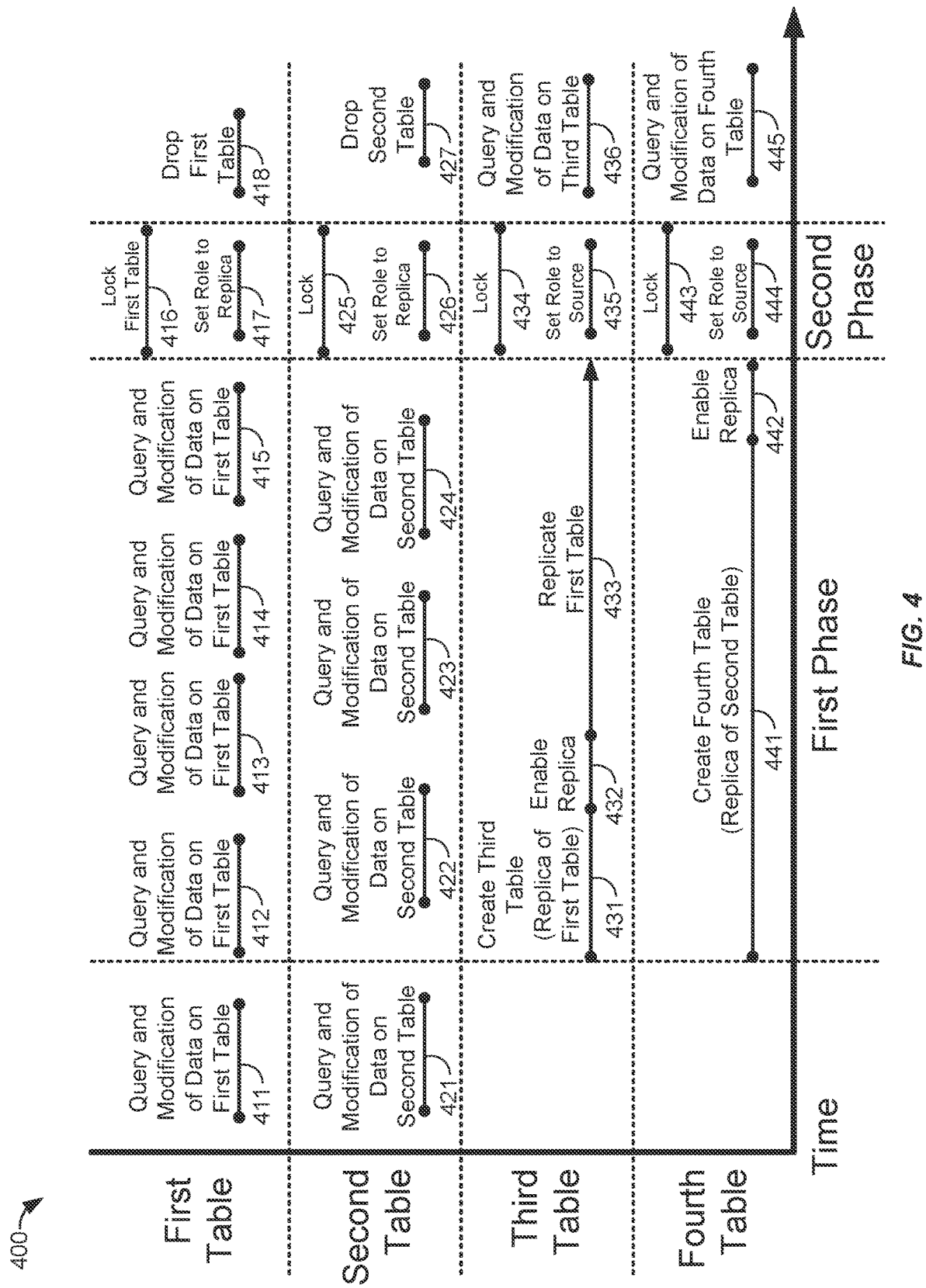
FIG. 4 shows a timeline of moving grouped tables in two phases, according to an embodiment.

The two phase move is described in further details below. FIG. 2 describes the functional components used in performing the two phase move, FIG. 3 shows a show chart of the two phase move process, and FIG. 4 shows a timeline of an exemplary two phase move.

FIG. 2 shows a diagram 200 of a database manager component 220 of a database system and functional components of the database manager 220, according to an embodiment. The database manager 220 may be implemented as the database manager 120 described with respect to in FIG. 1. The database manager 220 includes functional components including a copy table component 221, a set host role component 222, a set table role component 223, an enable replica component 224, a drop table component 225, a lock table component 226, and other components (not shown) for configuring and managing database tables and host systems.

The copy table component 221 may be configured to initiate creation of a replica table (set to a replica table-role) on host system that replicates a source table (set to a source table-role). The creation of the replica table includes transfer of information of the source table from the source host system to the destination host system. In the two phase move operation, the source table may not be locked against modifications during the transfer of the information or the creation of the replica table.

The set host role component 222 may be configured to set a host-role of a host system. The host-role of a host system may indicate whether that host system stored source tables or not (e.g., whether the host system only stores replica tables).

The set table role component 223 may be configured to set table-roles of tables. For instance, a table may be set to a source table-role or it may be set to a replica table-role. In some embodiments, tables having a source role may be modified while tables having a replica role may merely replicate modifications made to the source table. That is, the replica table may be accessed by queries but queries may not directly modify a replica. Instead, the source table may be modified and that modification propagated to the corresponding replica. A table set to the replica role may be dropped without requiring table redistribution to be performed (e.g., because the data is maintained by a source table). However, a table set to the source role may not be dropped without first copying the table, setting the copy to the source role, setting the original to not have the source role, and then dropping the original table. During a two phase move, the set table role component 223 may determine whether creation of the replica tables is complete and then switch roles of the original source table and the created replica table such that the original table is set to the replica role and the newly created table (set to the replica role) is set to the source role.

The enable replica component 224 may enable replication of the source table to the corresponding replica table after the replica table is created. That is, the enable replica component 224 may enable propagation of modifications from a source table to its corresponding replica table.

The drop table component 225 may be configured to drop (e.g., delete, remove) tables. The dropping of tables may be initiated and then later performed during a clean-up operation. As mentioned above, a replica table may be dropped however a source table may not be dropped as part of a move operation. The source table should be maintained during a move operation and not dropped without a specific command to drop that table.

The lock table component 226 may be configured to lock tables. Tables may be locked from modifications but be accessible for reads or tables may be locked against both reads and modifications.

The functionality of these components of the database manager 220 is used in performing the two phase move as described below.

FIG. 3 shows a flow chart of a process for a two-phased move of grouped tables, according to an embodiment. This process may be implemented in a database system such as the database system 110 described above with respect to FIG. 1. The two-phase move process may be initiated and managed by a database manager component such as the database manager 110 of FIG. 1 and the database manager 220 of FIG. 2.

At 301, the process stores a first group of tables of a database on a first host system, the first group of tables including a first table and a second table, where the first table and the second table are set to a source role. The storing at 301 may be performed before the two phase move is initiated. That is, the storing of the tables may not be part of the move operation.

A first phase of the two phase move process may include subprocesses 302-305.

At 302, the process creates a third table on a second host system, the third table replicating the first table and set to the replica role. The creation of the third table at 302 may be performed after the storing of tables at 301 is complete. The creation of the third table may include a first transfer of first information of the first table from the first host system to the second host system. The first table and the second table may not be locked against modifications during the first transfer of the first information or the creation of the third table.

At 303, the process creates a fourth table on the second host system, the fourth table replicating the second table and set to the replica role. The creation of the fourth table at 303 may be performed after the storing of tales at 301 is complete. The creation of the fourth table may include a second transfer of second information of the second table from the first host system to the second host system. The first table and the second table may not be locked against modifications during the second transfer of the second information or the creation of the fourth table.

At 304, the process enables replication of the first table by the third table. The enabling at 304 may be performed after the creation at 302 is complete. The enabling at 304 may be optional or unnecessary in some database systems and is shown with dotted lines in FIG. 3 to indicate that it may not be performed in some cases. For instance, the process may enable replication for the third table such that modifications to the first table stored on the first host system are propagated to the third table stored on the second host system. The enabling of replication for the third table may be performed in response to the creation of the third table and performed before the switching of the roles of the first table and the third table. In some cases, the creation of the third table and the enabling of replication for the third table is completed during the second transfer of the second information of the second table from the first host system to the second host system. In such cases, any modifications to the first table (stored on the first host system) may be propagated to the third table during the second transfer of the second information.

At 305, the process enables replication of the second table by the fourth table. The enabling at 305 may be performed after the creation at 303 is complete. The enabling at 305 may be optional or unnecessary in some database systems and is shown with dotted lines in FIG. 3 to indicate that it may not be performed in some cases. For instance, the process may enable replication for the fourth table such that modifications to the second table stored on the first host system are propagated to the fourth table stored on the second host system. The enabling of replication for the fourth table being performed in response to the creation of the fourth table and performed before the switching of the roles of the second table and the fourth table. In some cases, the creation of the fourth table and the enabling of replication for the fourth table is completed during the first transfer of the first information of the first table from the first host system to the second host system. In such cases any modifications to the second table (stored on the first host system) may be propagated to the fourth table during the first transfer of the first information.

A second phase of the two phase move process may include subprocesses 306-309. The first phase ends and the second phase begins after all tables to be moved have been replicated and enables.

At 306, the process switches roles of the first table and the third table. For instance, the process may switch roles of the first table and the third table such that the first table stored on the first host system is set to the replica role and the third table stored on the second host system is set to the source role. In some embodiments, the first table and the third table are identifiable by a first table identifier and queries for the first table identifier are routed to the first table before the switching of the roles of the first table and the third table while later queries for the first table identifier are routed to the first table after the switching of the roles of the first table and the third table.

At 307, the process switches roles of the first table and the third table. For instance, the process may switch roles of the second table and the fourth table such that the second table stored on the first host system is set to the replica role and the fourth table stored on the second host system is set to the source role. In some embodiments, the second table and the fourth table are identifiable by a second table identifier and queries for the second table identifier are routed to the second table before the switching of the roles of the second table and the fourth table while later queries for the second table identifier are routed to the fourth table after the switching of the roles of the second table and the fourth table.

At 308, the process drops the first table. The dropping at 308 may be performed after the switching of the roles of the first table and the third table.

At 309, the process drops the second table. The dropping at 309 may be performed after the switching of the roles of the second source table and the second replica table.

By this process the tables to be moved are replicated (instead of being moved directly) to the destination in the first phase such that queries accessing tables in the first group of tables may be routed to the first host system, thereby reducing or avoiding cross-host communication in a situation where some tables of the group have been moved while others are still in the move process. Once all tables of the group have been replicated and replication enabled, the second phase of the move begins and the roles of the tables are switched such that the original tables may be dropped. Thus, queries only against tables in the first group of tables are routed to a single host system and are processed without communicating with another host system.

An exemplary table redistribution plan using this two-phase move technique is described below. FIG. 4 shows a timeline of moving grouped tables in two phases, according to an embodiment. The first table and second table are originally source tables stored on a first host system while the third table and the fourth table are replicas of the first and second table, respectively, and are created on a second host system. In FIG. 4, operations on or for a first table, second table, third table, and fourth table are separated vertically by horizontal dotted lines and are drawn over time along the horizontal axis. A first phase and a second phase are shown, separated by dotted lines going vertically. For illustrative purposes, the length of time of the operations is not the focus but instead the timing of operations with respect to each other is the focus.

Before the move is initiated, queries and modification of data on the first table may be performed during time period 411. Additional queries and modifications of data on the first table during time periods 412, 413, 414, and 415 may be performed. These additional queries and modifications 412, 413, 414, and 415 may be performed during the first phase of the move. That is, the first table is not locked against modifications to the table or against queries during the first phase. Similarly, queries and modification of data on the second table during time periods 421, 422, 423, and 424 may be performed before and during the first phase of the move. That is, the second table is not locked against modifications to the table or against queries during the first phase. In some embodiments, the first and second tables may be briefly locked before creating the replica tables (e.g., to update a catalog), as mentioned above.

During the first phase of the move, the move operation creates a third table that is a replica of the first table during time period 431 and then enables replication on that third table during period 432. After replication is enabled, replication of the first table by the third table is performed during time period 433. In this example, the third table is created in a shorter period of time compared to the creation of the fourth table, which is a replica of the second table, which happens during period 441. It may take longer to create the fourth table than the third table because the second table is larger than the first table, requiring longer transfer times, or due to network conditions or other situations.

While the third table have been created over 431 and enabled over 432, the table is not set to the source role and the first table is not dropped until all tables of the group (in this case, the first and second tables) have been replicated (e.g., created and enabled). At time period 442 the fourth table is enabled after it has been created during 441. After period 442, all tables of the group have been replicated and the second phase of the move begins. During this second phase the move operation locks the first table during 416, locks the second table during 425, locks the third table during 434, and locks the fourth table during 442. During these locks, the first table is set to the replica role during 417, the second table is set to the replica role during 426, the third table is set to the source rule during 435, and the fourth table is set to the source role during 444.

Once the roles have been switched, queries and modifications of data may be performed on the third table during 436 (and other queries as well going forward). And queries and modifications of data may be performed on the fourth table during 445 (and other queries as well going forward). The dropping of the first table and the second table may be initiated such that the first table is later dropping during 418 and the second table is later dropped during 427.

Thus, the tables of the group are moved in two phases such that queries and modifications against only tables in that group are managed by a first host system during the first phase of the move (e.g., the table is not locked) without cross-host communication. Then after all tables have been replicated, the tables locked while switching roles between source and replica, thereby reducing cross-host communication and avoiding delays in query processing that would result from cross-host communication.

Example Hardware

Figure 5:
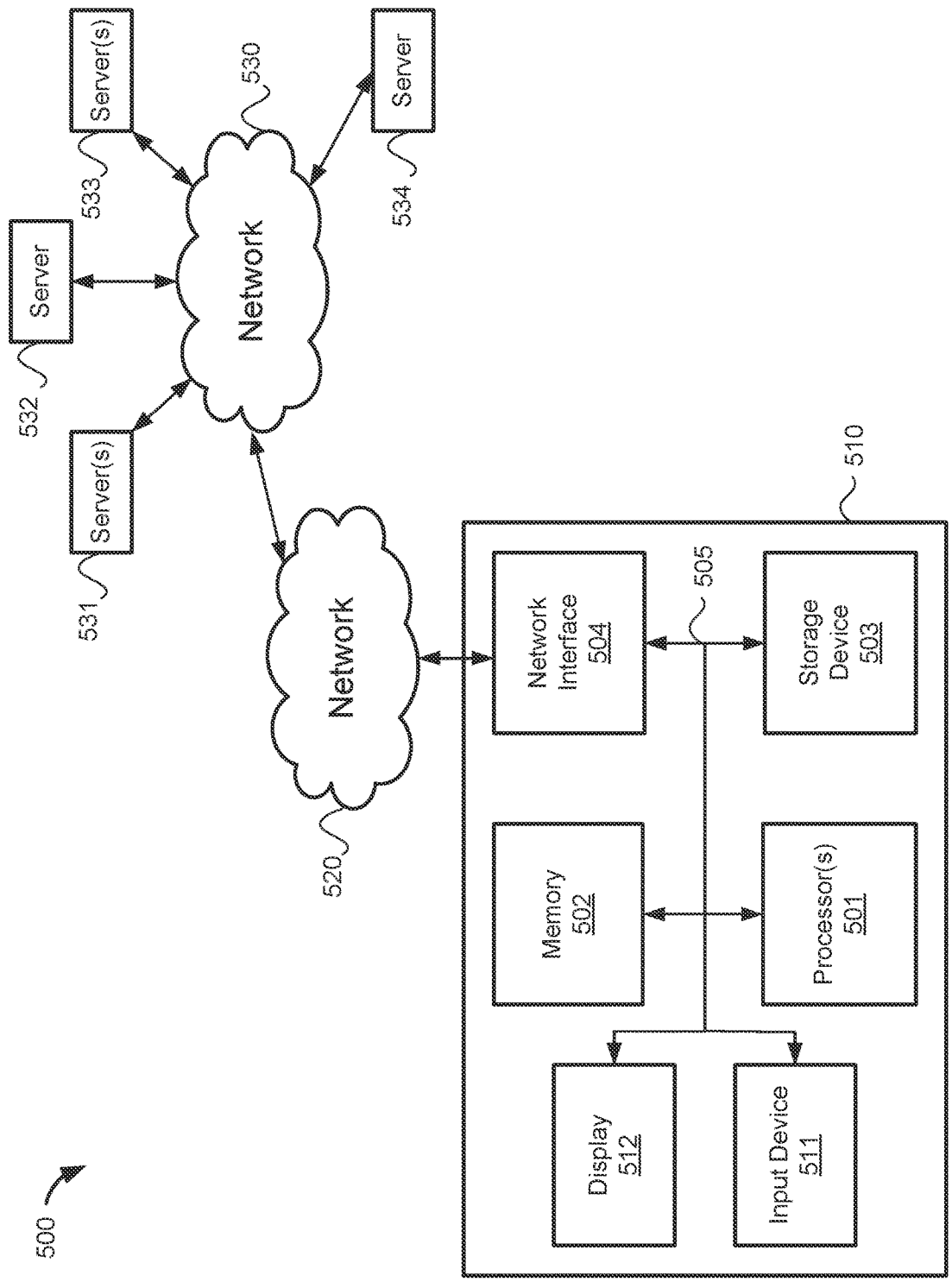
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer program code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

Example Embodiments

Various example embodiments implementing the techniques discussed above are described below.

Some embodiments provide one or more non-transitory computer-readable medium storing computer program code comprising sets of instructions. The computer program code may include sets of instructions to store a first group of tables of a database on a first host system. The first group of tables may include a first table and a second table. The first table may be set to a source role. The second table may also be set to the source role. The computer program code may also include instructions to create a third table on a second host system. The third table may replicate the first table and may be set to a replica role. The creation of the third table may include a first transfer of first information of the first table from the first host system to the second host system. The first table and the second table may not be locked against modifications during the first transfer of the first information or the creation of the third table. The computer program code may also include instructions to create a fourth table on the second host system. The fourth table may replicate the second table and may set be to the replica role. The creation of the fourth table may include a second transfer of second information of the second table from the first host system to the second host system. The first table and the second table may not be locked against modifications during the second transfer of the second information or the creation of the fourth table. The computer program code may also include instructions to, after the creation of the third table and the creation of fourth table, switch roles of the first table and the third table such that the first table stored on the first host system is set to the replica role and the third table stored on the second host system is set to the source role. The computer program code may also include instructions to, after the creation of the third table and the creation of fourth table, switch roles of the second table and the fourth table such that the second table stored on the first host system is set to the replica role and the fourth table stored on the second host system is set to the source role. The computer program code may also include instructions to drop the first table after the switching of the roles of the first table and the third table. The computer program code may also include instructions to drop the second table after the switching of the roles of the second source table and the second replica table.

Some embodiments provide a computer-implemented method. The method may comprise storing a first group of tables of a database on a first host system. The first group of tables may include a first table and a second table. The first table may be set to a source role. The second table may also be set to the source role. The method may further include creating a third table on a second host system. The third table may replicate the first table and may be set to a replica role. The creation of the third table may include a first transfer of first information of the first table from the first host system to the second host system. The first table and the second table may not be locked against modifications during the first transfer of the first information or the creation of the third table. The method may further include creating a fourth table on the second host system. The fourth table may replicate the second table and may set be to the replica role. The creation of the fourth table may include a second transfer of second information of the second table from the first host system to the second host system. The first table and the second table may not be locked against modifications during the second transfer of the second information or the creation of the fourth table. The method may further include, after the creation of the third table and the creation of fourth table, switching roles of the first table and the third table such that the first table stored on the first host system is set to the replica role and the third table stored on the second host system is set to the source role. The method may further include, after the creation of the third table and the creation of fourth table, switching roles of the second table and the fourth table such that the second table stored on the first host system is set to the replica role and the fourth table stored on the second host system is set to the source role. The method may further include dropping the first table after the switching of the roles of the first table and the third table. The method may further include dropping the second table after the switching of the roles of the second source table and the second replica table.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors;
   one or more machine-readable medium coupled to the one or more processors and storing computer program code comprising sets instructions executable by the one or more processors to:
   store a first group of tables of a database on a first host system, the first group of tables including a first table and a second table, the first table set to a source role, the second table set to the source role;
   create a third table on a second host system, the third table replicating the first table and set to a replica role, the creation of the third table including a first transfer of first information of the first table from the first host system to the second host system, the first table and the second table not being locked against modifications during the first transfer of the first information or the creation of the third table;
   create a fourth table on the second host system, the fourth table replicating the second table and set to the replica role, the creation of the fourth table including a second transfer of second information of the second table from the first host system to the second host system, the first table and the second table not being locked against modifications during the second transfer of the second information or the creation of the fourth table;
   after the creation of the third table and the creation of fourth table, switch roles of the first table and the third table such that the first table stored on the first host system is set to the replica role and the third table stored on the second host system is set to the source role, and switch roles of the second table and the fourth table such that the second table stored on the first host system is set to the replica role and the fourth table stored on the second host system is set to the source role;
   drop the first table after the switching of the roles of the first table and the third table; and
   drop the second table after the switching of the roles of the second source table and the second replica table.

2. The computer system of claim 1, wherein the first table and the third table are identifiable by a first table identifier, wherein queries for the first table identifier are routed to the first table before the switching of the roles of the first table and the third table, and later queries for the first table identifier are routed to the first table after the switching of the roles of the first table and the third table.

3. The computer system of claim 1, wherein the second table and the fourth table are identifiable by a second table identifier, wherein queries for the second table identifier are routed to the second table before the switching of the roles of the second table and the fourth table, and later queries for the second table identifier are routed to the fourth table after the switching of the roles of the second table and the fourth table.

4. The computer system of claim 1, wherein the computer program code further comprises sets instructions executable by the one or more processors to:
  enable replication for the third table such that modifications to the first table stored on the first host system are propagated to the third table stored on the second host system, the enabling of replication for the third table being performed in response to the creation of the third table and performed before the switching of the roles of the first table and the third table; and
  enable replication for the fourth table such that modifications to the second table stored on the first host system are propagated to the fourth table stored on the second host system, the enabling of replication for the fourth table being performed in response to the creation of the fourth table and performed before the switching of the roles of the second table and the fourth table.

5. The computer system of claim 4, wherein the creation of the third table and the enabling of replication for the third table is completed during the second transfer of the second information of the second table from the first host system to the second host system, the modifications to the first table stored on the first host system being propagated to the third table during the second transfer of the second information.

6. The computer system of claim 4, wherein the creation of the fourth table and the enabling of replication for the fourth table is completed during the first transfer of the first information of the first table from the first host system to the second host system, the modifications to the second table stored on the first host system being propagated to the fourth table during the first transfer of the first information.

7. The computer system of claim 1, wherein queries against tables in the first group of tables are routed to a single host system and are processed without communicating with another host system.

8. One or more non-transitory computer-readable medium storing computer program code comprising sets of instructions to:
  store a first group of tables of a database on a first host system, the first group of tables including a first table and a second table, the first table set to a source role, the second table set to the source role;
  create a third table on a second host system, the third table replicating the first table and set to a replica role, the creation of the third table including a first transfer of first information of the first table from the first host system to the second host system, the first table and the second table not being locked against modifications during the first transfer of the first information or the creation of the third table;
  create a fourth table on the second host system, the fourth table replicating the second table and set to the replica role, the creation of the fourth table including a second transfer of second information of the second table from the first host system to the second host system, the first table and the second table not being locked against modifications during the second transfer of the second information or the creation of the fourth table;
  after the creation of the third table and the creation of fourth table, switch roles of the first table and the third table such that the first table stored on the first host system is set to the replica role and the third table stored on the second host system is set to the source role, and switch roles of the second table and the fourth table such that the second table stored on the first host system is set to the replica role and the fourth table stored on the second host system is set to the source role;
  drop the first table after the switching of the roles of the first table and the third table; and
  drop the second table after the switching of the roles of the second source table and the second replica table.

9. The non-transitory computer-readable medium of claim 8, wherein the first table and the third table are identifiable by a first table identifier, wherein queries for the first table identifier are routed to the first table before the switching of the roles of the first table and the third table, and later queries for the first table identifier are routed to the first table after the switching of the roles of the first table and the third table.

10. The non-transitory computer-readable medium of claim 8, wherein the second table and the fourth table are identifiable by a second table identifier, wherein queries for the second table identifier are routed to the second table before the switching of the roles of the second table and the fourth table, and later queries for the second table identifier are routed to the fourth table after the switching of the roles of the second table and the fourth table.

11. The non-transitory computer-readable medium of claim 8, wherein the computer program code further comprises sets instructions to:
  enable replication for the third table such that modifications to the first table stored on the first host system are propagated to the third table stored on the second host system, the enabling of replication for the third table being performed in response to the creation of the third table and performed before the switching of the roles of the first table and the third table; and
  enable replication for the fourth table such that modifications to the second table stored on the first host system are propagated to the fourth table stored on the second host system, the enabling of replication for the fourth table being performed in response to the creation of the fourth table and performed before the switching of the roles of the second table and the fourth table.

12. The non-transitory computer-readable medium of claim 11, wherein the creation of the third table and the enabling of replication for the third table is completed during the second transfer of the second information of the second table from the first host system to the second host system, the modifications to the first table stored on the first host system being propagated to the third table during the second transfer of the second information.

13. The non-transitory computer-readable medium of claim 11, wherein the creation of the fourth table and the enabling of replication for the fourth table is completed during the first transfer of the first information of the first table from the first host system to the second host system, the modifications to the second table stored on the first host system being propagated to the fourth table during the first transfer of the first information.

14. The non-transitory computer-readable medium of claim 8, wherein queries against tables in the first group of tables are routed to a single host system and are processed without communicating with another host system.

15. A computer-implemented method, comprising:
  storing a first group of tables of a database on a first host system, the first group of tables including a first table and a second table, the first table set to a source role, the second table set to the source role;

creating a third table on a second host system, the third table replicating the first table and set to a replica role, the creation of the third table including a first transfer of first information of the first table from the first host system to the second host system, the first table and the second table not being locked against modifications during the first transfer of the first information or the creation of the third table;

creating a fourth table on the second host system, the fourth table replicating the second table and set to the replica role, the creation of the fourth table including a second transfer of second information of the second table from the first host system to the second host system, the first table and the second table not being locked against modifications during the second transfer of the second information or the creation of the fourth table;

after the creation of the third table and the creation of fourth table, switching roles of the first table and the third table such that the first table stored on the first host system is set to the replica role and the third table stored on the second host system is set to the source role, and switching roles of the second table and the fourth table such that the second table stored on the first host system is set to the replica role and the fourth table stored on the second host system is set to the source role;

dropping the first table after the switching of the roles of the first table and the third table; and dropping the second table after the switching of the roles of the second source table and the second replica table.

16. The computer-implemented method of claim 15, wherein the first table and the third table are identifiable by a first table identifier, wherein queries for the first table identifier are routed to the first table before the switching of the roles of the first table and the third table, and later queries for the first table identifier are routed to the first table after the switching of the roles of the first table and the third table.

17. The computer-implemented method of claim 15, wherein the second table and the fourth table are identifiable by a second table identifier, wherein queries for the second table identifier are routed to the second table before the switching of the roles of the second table and the fourth table, and later queries for the second table identifier are routed to the fourth table after the switching of the roles of the second table and the fourth table.

18. The computer-implemented method of claim 15, further comprising:

enabling replication for the third table such that modifications to the first table stored on the first host system are propagated to the third table stored on the second host system, the enabling of replication for the third table being performed in response to the creation of the third table and performed before the switching of the roles of the first table and the third table; and enabling replication for the fourth table such that modifications to the second table stored on the first host system are propagated to the fourth table stored on the second host system, the enabling of replication for the fourth table being performed in response to the creation of the fourth table and performed before the switching of the roles of the second table and the fourth table.

19. The computer-implemented method of claim 18, wherein the creation of the third table and the enabling of replication for the third table is completed during the second transfer of the second information of the second table from the first host system to the second host system, the modifications to the first table stored on the first host system being propagated to the third table during the second transfer of the second information.

20. The computer-implemented method of claim 18, wherein the creation of the fourth table and the enabling of replication for the fourth table is completed during the first transfer of the first information of the first table from the first host system to the second host system, the modifications to the second table stored on the first host system being propagated to the fourth table during the first transfer of the first information.

\* \* \* \* \*